T 857,008

BEST AVAILABLE COPY

DEC 3 1968 T857008

DEFENSIVE PUBLICATION

UNITED STATES PATENT OFFICE

T857008

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 43

629,901

ANHYDROUS PREPARATION OF MONOVINYLACETYLENE UTILIZING CATALYST SYSTEM CONTAINING CATALYST REACTION CONTROL DILUENT

Ransom Edward Ashmore, Louisville, Ky., assignor to E. I. du Pont de Nemours and Company, Wilmington, Del., a corporation of Delaware

Filed Apr. 11, 1967. Published Dec. 3, 1968

Class 260—678

No Drawing. 8 Pages Specification

An essentially anhydrous cuprous chloride catalyst system for polymerizing acetylene to monovinylacetylene which comprises substantially (1) about 10–95 volume percent of a solution of cuprous chloride and an amine hydrochloride selected from the group consisting of primary and secondary amine hydrochlorides containing not more than six carbon atoms, in an anhydrous liquid carboxylic acid amide containing not more than six carbon atoms, said amide amounting to less than 53% by weight of said solution and (2) about 90–5 volume percent of hydrocarbon ether as reaction control diluent. A preferred ether is diphenyl ether. The reaction control diluent is a hydrocarbon ether having the formula R—O—R′ wherein R and/or R′ are alkyl, cycloalkyl, aralkyl or aryl radicals optionally substituted with halogen or alkyl groups. Said diluent should boil above 100° C. and preferably between 150° C. to about 200° C. The melting point of the pure reaction control diluent must be at or below the catalyst system reaction temperatures; included are: dihexyl ether, diphenyl ether, benzyl-n-butyl ether, p-chlorophenyl methyl ether, p-tert. butylphenyl methyl ether, p-tert. butylphenyl ethyl ether, p-tert. butylphenyl isopropyl ether, p-tert. butylphenyl benzyl ether and dibenzyl ether.

Said reaction control diluent forms an immiscible phase and is incorporated into said catalyst system in said polymerization followed by recovering monovinylacetylene from the resulting exit gas.

The use of reaction control diluent achieves a practical degree of tar solvency, high yield of monovinylacetylene, a high conversion of acetylene and permits more catalyst flexibility. Improved catalyst performance and life is achieved.